(12) United States Patent
Browne et al.

(10) Patent No.: US 9,211,687 B2
(45) Date of Patent: Dec. 15, 2015

(54) SELF-HEALING AND SELF-CLEANING TIRES UTILIZING ACTIVE MATERIAL ACTUATION

(75) Inventors: Alan L. Browne, Grosse Pointe, MI (US); Nancy L. Johnson, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1280 days.

(21) Appl. No.: 12/489,113

(22) Filed: Jun. 22, 2009

(65) Prior Publication Data

US 2009/0314406 A1 Dec. 24, 2009

Related U.S. Application Data

(60) Provisional application No. 61/075,018, filed on Jun. 24, 2008.

(51) Int. Cl.
*B60C 11/00* (2006.01)
*B29D 30/52* (2006.01)
*B29D 30/00* (2006.01)
*B60C 9/18* (2006.01)
*B60C 19/12* (2006.01)

(52) U.S. Cl.
CPC ............ *B29D 30/52* (2013.01); *B29D 30/0061* (2013.01); *B60C 9/18* (2013.01); *B60C 11/00* (2013.01); *B60C 19/12* (2013.01); *B60C 2019/004* (2013.04); *Y10T 152/10* (2015.01); *Y10T 152/10675* (2015.01)

(58) Field of Classification Search
CPC ....................................................... B60C 11/00
USPC .................... 152/152.1, 209.5; 156/95, 97
See application file for complete search history.

(56) References Cited

U.S. PATENT DOCUMENTS

| | | | |
|---|---|---|---|
| 4,317,692 A | 3/1982 | Niconchuk | |
| 6,508,898 B1 | 1/2003 | Rustad | |
| 7,276,195 B1 * | 10/2007 | Tong | 264/219 |
| 7,575,807 B1 * | 8/2009 | Barvosa-Carter et al. | 428/411.1 |
| 2002/0098924 A1 * | 7/2002 | Houser et al. | 473/524 |
| 2004/0016486 A1 * | 1/2004 | Tropper | 152/151 |
| 2004/0055686 A1 * | 3/2004 | Cowger et al. | 152/516 |
| 2006/0157908 A1 * | 7/2006 | Verbrugge et al. | 269/224 |
| 2008/0173382 A1 * | 7/2008 | Gobinath et al. | 152/502 |
| 2009/0047197 A1 * | 2/2009 | Browne et al. | 422/307 |
| 2009/0229358 A1 * | 9/2009 | Jongsma et al. | 152/152.1 |
| 2009/0315696 A1 * | 12/2009 | Browne et al. | 340/442 |
| 2011/0024010 A1 * | 2/2011 | Browne et al. | 152/209.5 |

FOREIGN PATENT DOCUMENTS

| | | | |
|---|---|---|---|
| EP | 1529657 A1 * | 5/2005 | |
| JP | 2005-212669 A | 8/2005 | |
| KR | 10-2001-0092429 A | 10/2001 | |
| WO | WO-96/12588 A1 * | 5/1996 | |
| WO | WO-2009/002586 A2 * | 12/2008 | |

* cited by examiner

*Primary Examiner* — Steven D Maki
(74) *Attorney, Agent, or Firm* — Reising Ethington P.C.

(57) ABSTRACT

A self-healing and/or self-cleaning tire comprising at least one active material element configured when undergoing an actuation cycle to repair a structural anomaly, such as a crack or puncture, and/or remove a surface anomaly, such as foreign substances or objects adhered to or lodged in the tire.

15 Claims, 3 Drawing Sheets

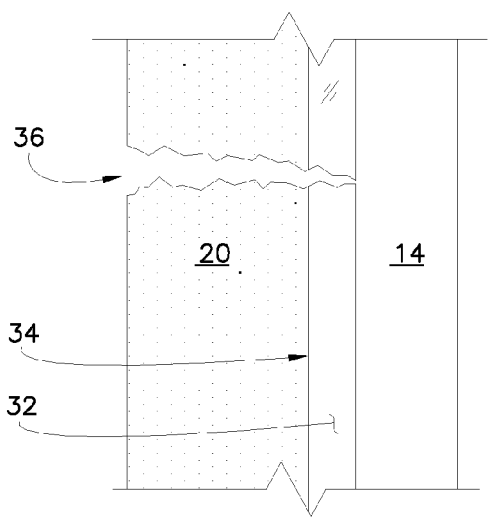 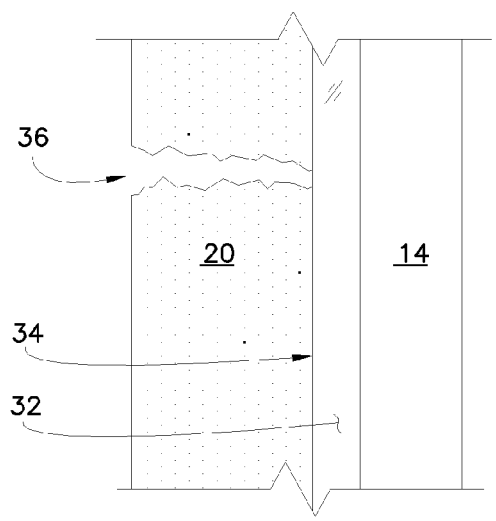
FIG. 5    FIG. 5a
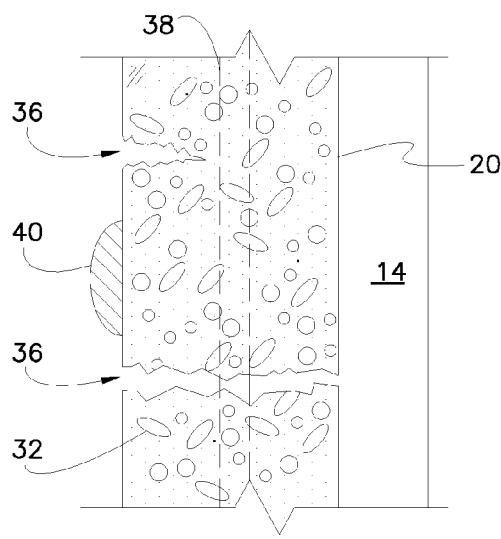 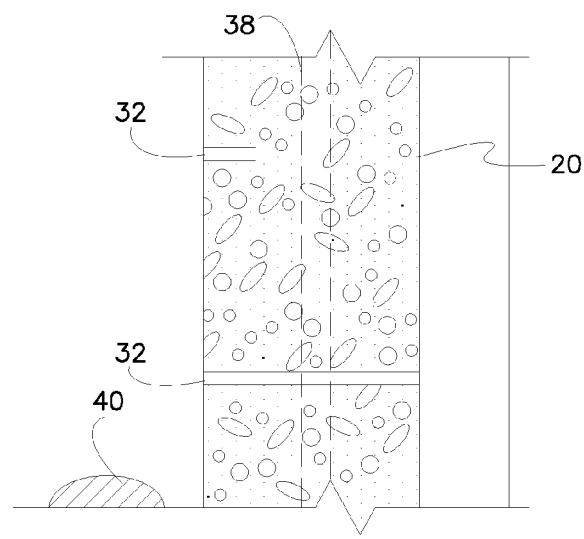
FIG. 6    FIG. 6a

SELF-HEALING AND SELF-CLEANING TIRES UTILIZING ACTIVE MATERIAL ACTUATION

RELATED APPLICATIONS

This patent application claims priority to, and benefit from U.S. Provisional Patent Application Ser. No. 61/075,018, entitled "METHODS OF ENHANCING TIRE PERFORMANCE UTILIZING ACTIVE MATERIALS," and filed on Jun. 24, 2008, the disclosure of which being incorporated by reference herein.

BACKGROUND OF THE INVENTION

1. Field of the Invention

The present disclosure generally relates to tires, such as automobile tires, and more particularly to methods of self-healing and/or self-cleaning a tire utilizing active material actuation.

2. Discussion of Prior Art

Properly functioning tires are important to ensure the safety of the user. Of foremost concern, is the structural integrity and health of the tire. With respect to conventional elastomeric tires, for example, the structural components of the tire must be able to withstand and maintain the operative inflation pressure. As such, cracks and punctures that may develop over time and/or as a result of engagement with foreign objects, have been well known in the art to cause concerns, including nuisance leaks, flats, and even blow-outs. Once a crack, puncture, or the like develops, the user often incurs costly repair and/or replacement costs. Moreover, conventional sealants are only effective in healing punctures in the tread region.

Of further concern to users is maintaining the appearance of a clean and healthy tire, wherein such maintenance contributes to the satisfaction/comfort of the user, and preserves the value of the tire and/or vehicle. With respect to the tread pattern, cleaning also contributes to the proper function of providing traction on wet, slush, and snow covered pavements.

BRIEF SUMMARY

Responsive to these and other concerns, the present invention recites an adaptive or "smart" tire that is able to heal and/or clean itself, so as to maintain functionality. As such, in comparison to conventional tires, the invention is useful for reducing repair and replacement costs. Moreover, the inventive tire is able to reduce the manual labor required to maintain the look and feel of a clean healthy tire.

Thus, the inventive tire is adapted to autonomously repair or remove a structural or surficial anomaly, and presents an exterior face defined at least in part by at least one active material element. That is to say, where the anomaly has been caused to form upon or within the face, the change is configured to geometrically modify the face so as to repair or remove the anomaly. In the preferred embodiment, the element is formed of a shape memory polymer, and may further include shape memory alloy elements configured to conform the polymer. The self-healing and/or self-cleaning mechanism may be activated on-demand or passively.

The above described and other features are exemplified by the following figures and detailed description.

BRIEF DESCRIPTION OF THE DRAWINGS

Preferred embodiments of the invention are described in detail below with reference to the attached drawing figures of exemplary scale, wherein:

FIG. 5 is a cross-section of a tire section, particularly illustrating an interiorly overlying coating of shape memory polymer material having formed within it a structural anomaly, in accordance with a preferred embodiment of the invention;

FIG. 5a is the cross-section shown in FIG. 5, wherein the polymer has been activated, so as to remove the anomaly; and FIG. 6 is a cross-section of a tire section made of a heterogeneous formulation including a shape memory polymer, and shape memory alloy wires inter-engaged with the section, having formed thereupon and within surficial and structural anomalies, in accordance with a preferred embodiment of the invention; and FIG. 6a is a cross-section of the section shown in FIG. 6, wherein the polymer has been activated, so as to remove the anomalies.

DETAILED DESCRIPTION

The present invention concerns plural methods of enhancing tire performance generally utilizing active materials, and smart tires 10 employing the same. In general, the inventive tire 10, described and illustrated herein employs active material actuation to adapt to inherent conditions. More particularly, the present invention concerns methods of and configurations for self-healing and self-cleaning a tire 10 using active material actuation (FIGS. 1-6). The advantages and benefits of the invention may be used in various tire applications (e.g., with respect to bicycles, aviation, etc.), but are more particularly suited for use with an automotive vehicle 12 (e.g., motorcycle, car, truck, SUV, all-terrain vehicle, etc.).

Figure 1:
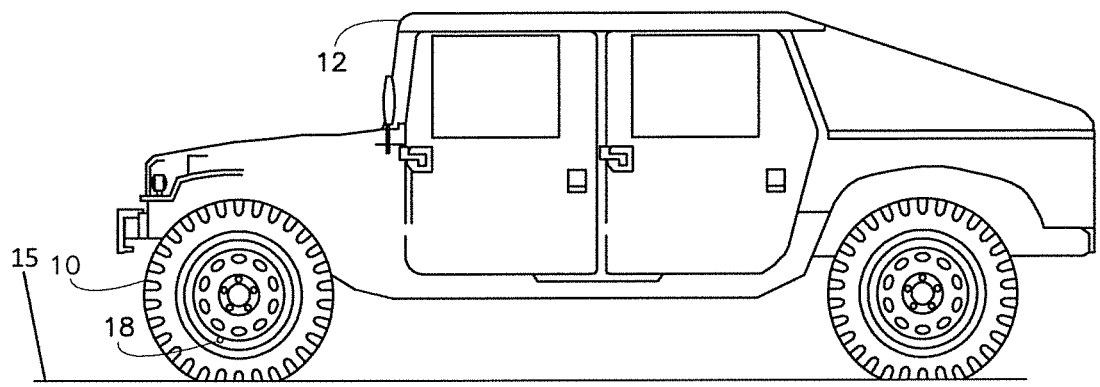
FIG. 1 is an elevation of a vehicle traveling upon a surface and having a smart tire, in accordance with a preferred embodiment of the invention.
Figure 2:
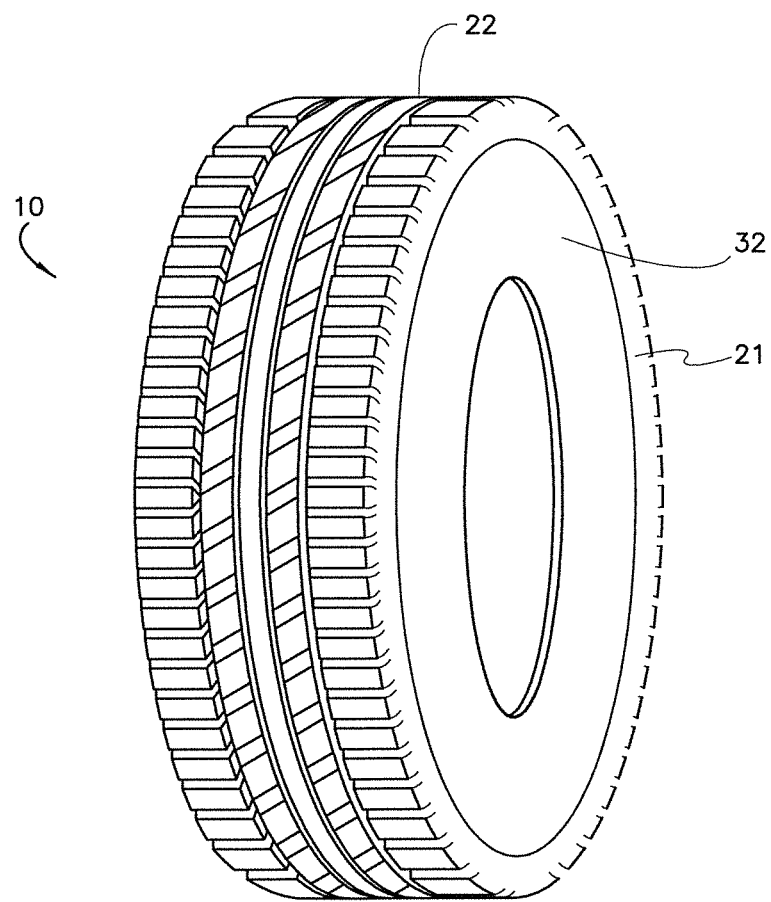
FIG. 2 is a perspective view of an adaptive tire presenting an exterior face defined by first and second sidewalls and a tread wall formed in part by an active material element, in accordance with a preferred embodiment of the invention.
Figure 3:
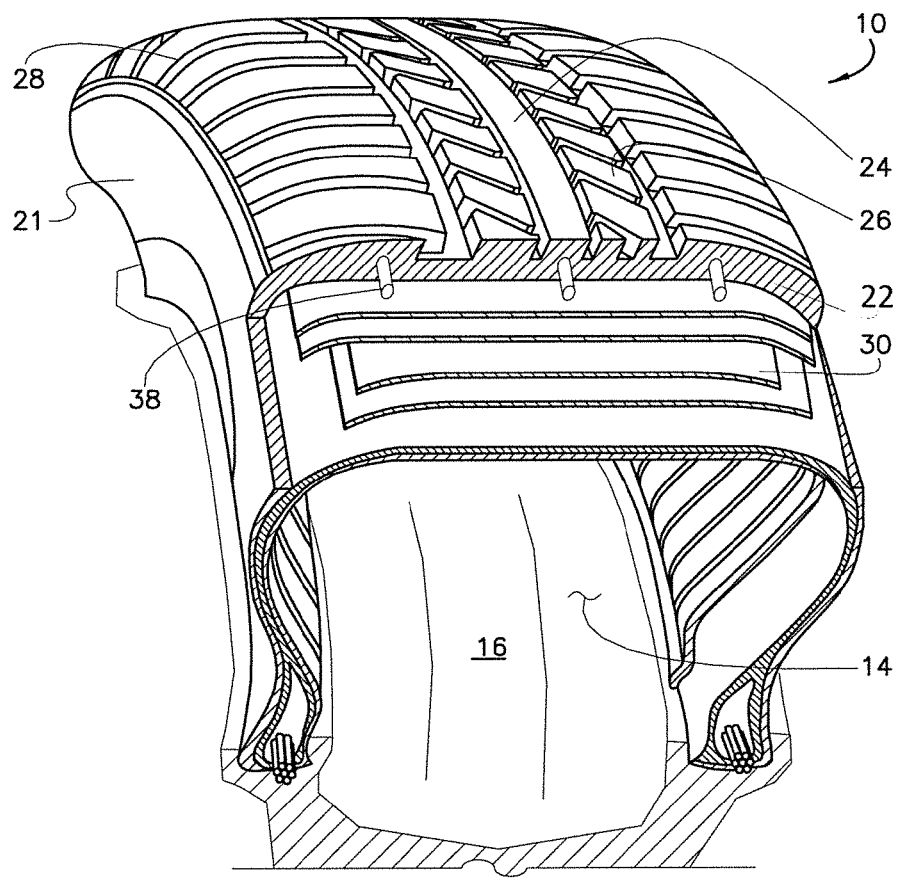
FIG. 3 is a cross-sectional view of a section of the tire shown in FIG. 2, particularly illustrating the active material element, and structural components, including tread elements, reinforcing belts, and a section of the wheel, in accordance with a preferred embodiment of the invention.

As best shown in FIGS. 2 and 3, the inventive modifications are adapted for use with an otherwise conventional elastomeric (e.g., synthetic and/or natural rubber) tire that defines an interior region 14 when mounted upon a wheel 16. A valve assembly 18 enables air to enter and be compressed within the region 16, so as to inflate the tire 10 to an operative pressure. The tire 10 is formed by a plurality of structural components 20, including first and second opposite sidewalls 21 interconnected by a tread wall 22. More particularly, and as shown in FIG. 3, the tread wall 22 may consist of a central rib 24, and tread elements 26 (or "blocks"). The tread wall 22 presents chamfered or rounded lateral shoulders 28 that transition into the outer periphery of the sidewalls 21.

Underneath the tread elements 26, a layer of reinforcing belts or plies 30 typically formed of steel, adds structural stability and puncture resistance to the tread wall 22. Among other things, the sidewalls 21 and tread wall 22 provide lateral and circumferential stability to the tire 10, respectively, and together with the compressed air transfers operational forces (e.g., weight, traction, centripetal, etc.) between the vehicle 12 and surface 15. It is appreciated that the afore-described conventional tire is exemplarily presented, and that the present invention may be used with various tire configurations and structural components not mentioned herein.

I. Active Material Discussion and Function

As previously mentioned, the inventive tire 10 employs the use of at least one active material element 32. As used herein the term "active material" shall be afforded its ordinary meaning as understood by those of ordinary skill in the art, and includes any material or composite that exhibits a reversible change in a fundamental (e.g., chemical or intrinsic physical) property, when exposed to an external signal source. Thus, active materials shall include those compositions that can exhibit a change in stiffness, modulus, shape and/or dimensions in response to the activation signal.

Depending on the particular active material, the activation signal can take the form of, without limitation, an electric current, an electric field (voltage), a temperature change, and the like. For example, a heat signal may be applied for changing the property of thermally activated active materials such as shape memory polymer (SMP) and shape memory alloy (SMA).

Suitable active materials for use with the present invention include, without limitation, SMA, SMP, and the like. The active material elements 32 may take many geometric forms including pellets, beads, fillers, sheets, layers, and wires disposed within or atop a structural component 20. As used herein, the term "wire" is further understood to encompass a range of longitudinal forms such as strands, braids, strips, bands, cables, slabs, springs, etc.

More particularly, SMA generally refers to a group of metallic materials that demonstrate the ability to return to some previously defined shape or size when subjected to an appropriate thermal stimulus. Shape memory alloys are capable of undergoing phase transitions in which their yield strength, stiffness, dimension and/or shape are altered as a function of temperature. The term "yield strength" refers to the stress at which a material exhibits a specified deviation from proportionality of stress and strain. Generally, in the low temperature, or martensite phase, shape memory alloys can be plastically deformed and upon exposure to some higher temperature will transform to an austenite phase, or parent phase, returning to their shape prior to the deformation. Materials that exhibit this shape memory effect only upon heating are referred to as having one-way shape memory. Those materials that also exhibit shape memory upon re-cooling are referred to as having two-way shape memory behavior.

Shape memory alloys exist in several different temperature-dependent phases. The most commonly utilized of these phases are the so-called Martensite and Austenite phases discussed above. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature ($A_s$). The temperature at which this phenomenon is complete is called the austenite finish temperature ($A_f$).

When the shape memory alloy is in the austenite phase and is cooled, it begins to change into the martensite phase, and the temperature at which this phenomenon starts is referred to as the martensite start temperature ($M_s$). The temperature at which austenite finishes transforming to martensite is called the martensite finish temperature ($M_f$). Generally, the shape memory alloys are softer and more easily deformable in their martensitic phase and are harder, stiffer, and/or more rigid in the austenitic phase. In view of the foregoing, a suitable activation signal for use with shape memory alloys is a thermal activation signal having a magnitude to cause transformations between the martensite and austenite phases.

Shape memory alloys can exhibit a one-way shape memory effect, an intrinsic two-way effect, or an extrinsic two-way shape memory effect depending on the alloy composition and processing history. Annealed shape memory alloys typically only exhibit the one-way shape memory effect. Sufficient heating subsequent to low-temperature deformation of the shape memory material will induce the martensite to austenite type transition, and the material will recover the original, annealed shape. Hence, one-way shape memory effects are only observed upon heating. Active materials comprising shape memory alloy compositions that exhibit one-way memory effects do not automatically reform, and will likely require an external mechanical force to reform the original shape.

Intrinsic and extrinsic two-way shape memory materials are characterized by a shape transition both upon heating from the martensite phase to the austenite phase, as well as an additional shape transition upon cooling from the austenite phase back to the martensite phase. Active materials that exhibit an intrinsic shape memory effect are fabricated from a shape memory alloy composition that will cause the active materials to automatically reform themselves as a result of the above noted phase transformations. Intrinsic two-way shape memory behavior must be induced in the shape memory material through processing. Such procedures include extreme deformation of the material while in the martensite phase, heating-cooling under constraint or load, or surface modification such as laser annealing, polishing, or shot-peening. Once the material has been trained to exhibit the two-way shape memory effect, the shape change between the low and high temperature states is generally reversible and persists through a high number of thermal cycles. In contrast, active materials that exhibit the extrinsic two-way shape memory effects are composite or multi-component materials that combine a shape memory alloy composition that exhibits a one-way effect with another element that provides a restoring force to reform the original shape.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the system with shape memory effects, superelastic effects, and high damping capacity.

Suitable shape memory alloy materials include, without limitation, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like.

Thus, for the purposes of this invention, it is appreciated that SMA's exhibit a modulus increase of 2.5 times and a dimensional change of up to 8% (depending on the amount of pre-strain) when heated above their Martensite to Austenite phase transition temperature. It is appreciated that thermally induced SMA phase changes are one-way so that a biasing force return mechanism (such as a spring) would be required to return the SMA to its starting configuration once the applied field is removed. Joule heating can be used to make the entire system electronically controllable. Stress induced phase changes in SMA are, however, two way by nature. Application of sufficient stress when an SMA is in its Austenitic phase will cause it to change to its lower modulus Martensitic phase in which it can exhibit up to 8% of "superelastic" deformation. Removal of the applied stress will cause the SMA to switch back to its Austenitic phase in so doing recovering its starting shape and higher modulus.

Shape memory polymers (SMP's) generally refer to a group of polymeric materials that demonstrate the ability to return to a previously defined shape when subjected to an appropriate thermal stimulus. Shape memory polymers are capable of undergoing phase transitions in which their shape is altered as a function of temperature. Generally, SMP's have two main segments, a hard segment and a soft segment. The previously defined or permanent shape can be set by melting or processing the polymer at a temperature higher than the highest thermal transition followed by cooling below that thermal transition temperature. The highest thermal transition is usually the glass transition temperature ($T_g$) or melting point of the hard segment. A temporary shape can be set by heating the material to a temperature higher than the $T_g$ or the transition temperature of the soft segment, but lower than the $T_g$ or melting point of the hard segment. The temporary shape is set while processing the material at the transition temperature of the soft segment followed by cooling to fix the shape. The material can be reverted back to the permanent shape by heating the unloaded material above the transition temperature of the soft segment.

For example, the permanent shape of the polymeric material may be a wire presenting a substantially straightened shape and defining a first length, while the temporary shape may be a similar wire defining a second length less than the first. In another embodiment, the material may present a spring having a first modulus of elasticity when activated and second modulus when deactivated.

The temperature needed for permanent shape recovery can be set at any temperature between about −63° C. and about 120° C. or above. Engineering the composition and structure of the polymer itself can allow for the choice of a particular temperature for a desired application. A preferred temperature for shape recovery is greater than or equal to about −30° C., more preferably greater than or equal to about 0° C., and most preferably a temperature greater than or equal to about 50° C. Also, a preferred temperature for shape recovery is less than or equal to about 120° C., and most preferably less than or equal to about 120° C. and greater than or equal to about 80° C.

Suitable shape memory polymers include thermoplastics, thermosets, interpenetrating networks, semi-interpenetrating networks, or mixed networks. The polymers can be a single polymer or a blend of polymers. The polymers can be linear or branched thermoplastic elastomers with side chains or dendritic structural elements. Suitable polymer components to form a shape memory polymer include, but are not limited to, polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methacrylate), poly(ethyl methacrylate), ply(butyl methacrylate), poly (isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate). Examples of other suitable polymers include polystyrene, polypropylene, polyvinyl phenol, polyvinylpyrrolidone, chlorinated polybutylene, poly(octadecyl vinyl ether) ethylene vinyl acetate, polyethylene, poly(ethylene oxide)-poly (ethylene terephthalate), polyethylene/nylon (graft copolymer), polycaprolactones-polyamide (block copolymer), poly (caprolactone) dimethacrylate-n-butyl acrylate, poly (norbornyl-polyhedral oligomeric silsequioxane), polyvinylchloride, urethane/butadiene copolymers, polyurethane block copolymers, styrene-butadiene-styrene block copolymers, and the like.

Thus, for the purposes of this invention, it is appreciated that SMP's exhibit a dramatic drop in modulus when heated above the glass transition temperature of their constituent that has a lower glass transition temperature. If loading/deformation is maintained while the temperature is dropped, the deformed shape will be set in the SMP until it is reheated while under no load under which condition it will return to its as-molded shape. While SMP's could be used variously in block, sheet, slab, lattice, truss, fiber or foam forms, they require continuous power to remain in their lower modulus state.

Desirably, the change in the property of the active material remains for the duration of the applied activation signal. In one embodiment, upon discontinuation of the activation signal, the property of the active material generally reverts to an unpowered form and returns substantially to its original property. As used herein, the term "return mechanism" generally refers to any component capable of providing a force opposite to a force provided by the active material, and includes, without limitation, springs, elastomers, additional active materials, and the like. In the present invention, it is appreciated that the elastomeric tire material may act as a return.

Subdivisions and/or combinations of active material can provide additional desirable device benefits, such as using activation of SMA to bring otherwise separated portions of SMP into contact to initiate self-healing and joining processes.

II. Exemplary Smart Tire Configurations and Methods of Use

Figure 4:
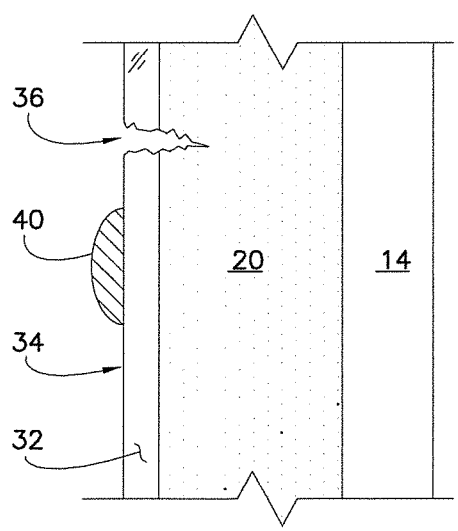
FIG. 4 is a cross-section of a tire section, particularly illustrating an overlying coating of shape memory polymer material having formed thereupon a surficial and a structural anomaly, in accordance with a preferred embodiment of the invention.
Figure 4A:
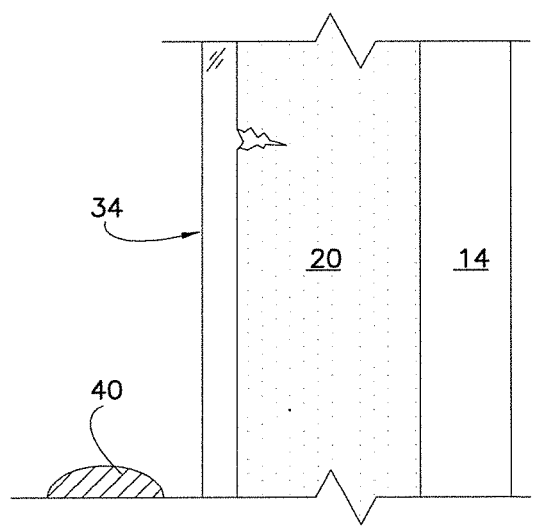
FIG. 4a is the cross-section shown in FIG. 4, wherein the polymer has been activated, so as to remove the anomaly.

In the preferred embodiments shown in FIGS. 4-6, the element 32 is formed of a suitable shape memory polymer (SMP) having an upper (of the higher temperature phase) glass transition temperature operable to withstand the normal operating temperatures of the tire 10. The element 32 presents a constituent of a heterogeneous formulation used to construct the structural components 20 of the tire 10 and/or a homogenous coating (i.e., coating, panel, etc.) 34 applied thereto.

In a first aspect of the invention, the SMP coating 34 and/or constituency is used to self-heal or repair a structural anomaly (e.g., cracks, fractures, scratches, peels, and punctures) 36 formed within the component (e.g., tread 22 and/or sidewalls 21). The coating 34 may be positioned adjacent either the inner or exterior component surface (compare FIGS. 4 and 5). To effect self-healing, the SMP material is simply caused to undergo at least one actuation cycle, as it is appreciated that SMP when in its high temperature low modulus state exhibits a combination of shape memory (which can bring separated surfaces back into contact) and self-healing/rejoining ability through the migration of long chain molecules and cohesive bonding.

More preferably, a secondary shape memory active material element 38, such as SMA wire segments in either a Martensitic pre-stretched or Austenitic super-elastic state is disposed within the coating 34 or component 20 to enhance the healing process. The secondary element 38 may take other forms such as strips, sheets, meshes, weaves, and discrete segments thereof. The secondary element 38, when activated, acts to close the cracks or punctures by re-establishing contact and thereby permitting rejoining of the separated elements of SMP.

The secondary element 38 may be heated in the Martensitic state or caused to super-elastically respond in the Austenitic state, so as to cause the re-establishment of contact and rejoining of the separated elements of SMP. More particularly, with respect to the former, it is appreciated that activation of the SMA and SMP may follow one of plural sequences: 1) the SMA is activated and deactivated first, 2) the SMA is activated first, and the SMP is deactivated first, 3) the SMP is activated and deactivated first, or 4) the SMP is activated first, and the SMA is deactivated first, depending primarily upon the constituency of the SMP, elasticity of the associated structural component, and/or whether the SMA element 38 has been trained to exhibit two-way shape memory. Based on the selected sequence, other benefits may be provided by the present invention; for example, where the SMA is deactivated after the SMP, it is appreciated that tensioning may result in the structural component 20 such that standing waves are reduced during vehicular usage.

In a second aspect of the invention, a method of self-cleaning surficial anomalies (e.g., dirt, and other foreign substances and objects) 40 from a tire face (e.g., tread pattern and/or sidewall surface features) utilizing a thin (e.g., 1 mm) coating 34 of SMP on the exterior surface and/or the incorporation of SMP within a tire component 20 that defines the surface is presented. Here, the self-cleaning properties of SMP are advantaged. More particularly, it is appreciated that SMP, when taken through a complete actuation cycle, causes substances and foreign objects adhered or bonded to, and otherwise lodged within to become disbonded, dislodged, etc.

It is appreciated that in both aspects, on-demand, as well as passive actuation may be provided. With respect to self-healing, for example, the SMP material may be activated by plugging the tire 10 into a cigarette adapter, so as to electrically couple the tire 10 and charging system of the vehicle 12. In this configuration, it is appreciated that the necessary electrical leads and resistive elements (not shown) are inter-engaged with the SMP material. Alternatively, the tire 10 may be constantly coupled to the charging system, and the self-healing function initiated by an automatically detected low inflation pressure sensor/pump (also not shown). In yet another alternative, the tire/wheel assembly can be placed for example into an oven or heated locally with a blow drier to allow the self-healing action to occur. The latter could be performed variously with the tire 10 and wheel 16 mounted on the vehicle 12 or after removal from the vehicle 12. Finally, an example of a passive mode of self-cleaning the tire 10 includes exposing the material to the sun and/or a minimum ambient temperature, so as to activate the SMP, and then causing an air flow adjacent the material, e.g., by driving the vehicle 12, sufficient to cool and deactivate the material.

As used herein, the terms "first", "second", and the like do not denote any order or importance, but rather are used to distinguish one element from another, and the terms "the", "a", and "an" do not denote a limitation of quantity, but rather denote the presence of at least one of the referenced item. Furthermore, all ranges directed to the same quantity of a given component or measurement is inclusive of the endpoints and independently combinable.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A tire, comprising a tire body bounded by an exterior viewable surface and hidden interior face, the tire being adapted to autonomously repair or remove an anomaly located on the exterior viewable tire surface or an anomaly which extends inwardly from the exterior viewable surface, at least a portion of one of the exterior viewable surface and interior face comprising a shape memory polymer active material element applied as a coating layer, the shape memory polymer active material element undergoing a reversible change from a lower temperature polymer phase to a lower modulus, higher temperature polymer phase, when heated to a temperature greater than an intended tire operating temperature, and, the shape memory polymer coating layer is positioned an arranged to geometrically modify the exterior viewable surface of the tire to repair or remove the anomaly when a low temperature to higher temperature polymer phase change of the shape memory polymer is performed and then reversed.

2. The tire as claimed in claim 1, wherein the tire comprises first and second sidewalls and a tread wall with tread elements and grooves between the tread elements, the layer of shape memory polymer active material element presents a homogenous coating superjacent at least a portion of the sidewalls and/or grooves of the tread wall, and the shape memory polymer active material element coating, or said at least portion, forms the exterior viewable surface.

3. The tire as claimed in claim 2, wherein the sidewalls and tread wall define inner and outer surfaces, and the coating of shape memory polymer active material is positioned adjacent the outer surface and defines the exterior viewable surface.

4. The tire as claimed in claim 2, wherein the sidewalls and tread wall define inner and outer surfaces, and the coating of shape memory polymer active material is positioned on the inner surface, of at least a portion of the sidewalls and/or tread wall.

5. The tire as claimed in claim 1, further comprising a shape memory alloy active material element inter-engaged with the shape memory polymer active material element coating layer, and configured to conform the shape memory polymer active material element coating layer, so as to further enable the lower temperature to higher temperature phase change of the shape memory polymer active material element coating layer to repair or remove to anomaly.

6. The tire as claimed in claim 5, wherein the shape memory alloy active material element is one of the group consisting of wires, strips, sheets, meshes, weaves, and discrete segments thereof.

7. The tire as claimed in claim 6, wherein the shape memory alloy active material element is formed of Martensitic shape memory alloy and is pre-stretched.

8. The tire as claimed in claim 6, wherein the shape memory alloy active material element is formed of Austenitic shape memory alloy.

9. The tire as claimed in claim 5 in which the shape memory alloy active material element undergoes transformation from a low temperature phase to a higher temperature phase at a lower temperature than the transformation of the shape memory polymer active material element and the shape alloy active material element undergoes a reverse transformation from its high temperature phase to its low temperature phase at a temperature which is lower than the temperature at which the shape memory polymer active material element transforms from its high temperature phase to its low temperature phase.

10. The tire as claimed in claim 1, wherein the anomaly is a structural anomaly and selected from the group consisting of cracks, fractures, scratches, peels, and punctures.

11. A tire as recited in claim 1 in which the shape memory polymer, when in its higher temperature phase, exhibits a shape memory effect to bring separated tire surfaces back into contact and promote self-healing/rejoining of the previously-separated surfaces through the migration of long chain molecules leading to cohesive bonding.

12. A tire comprising a tire body bounded by an exterior viewable surface and hidden interior face, the tire being adapted to autonomously repair or remove an anomaly located on the exterior viewable surface, at least a portion of one of the exterior viewable surface and interior face comprising a shape memory polymer active material element applied as a coating layer, the shape memory polymer active material element coating layer undergoing a reversible change from a lower temperature polymer phase to a lower modulus higher temperature polymer phase when heated to a temperature greater than an intended tire operating temperature, the shape memory polymer active material coating layer being configured to geometrically modify the exterior viewable surface so as to repair or remove the anomaly when a low temperature to higher temperature polymer phase change of the shape memory polymer is activated and then reversed; and, the tire further comprising shape memory alloy active material wire elements dispersed in the shape memory polymer active material element coating layer, and operable to conform the shape memory polymer active material element coating layer, so as to further enable the reversible change of the shape memory polymer active material element coating layer to repair or remove the anomaly.

13. A tire as recited in claim 12 in which the shape memory alloy wire elements are in the martensite phase at temperatures up to the intended tire operating temperature and are operable to undergo a reversible change to an austenite phase when heated above the intended tire operating temperature, the reversible change in the shape memory wire elements being configured to further enable the reversible change of the shape memory polymer active material to repair or remove the anomaly.

14. A tire as recited in claim 12 in which the shape memory alloy wire elements are in the austenite phase at temperatures up to the intended tire operating temperature and display superelasticity to further enable the reversible change of the shape memory polymer active material to repair or remove the anomaly.

15. A tire as recited in claim 12 in which the shape memory polymer, when in its higher temperature phase, exhibits a shape memory effect to bring separated tire surfaces back into contact and promote self-healing/rejoining of the previously-separated surfaces through the migration of long chain molecules leading to cohesive bonding.

* * * * *